UNITED STATES PATENT OFFICE.

GERHARD NICOLAAS VIS, OF PARIS, FRANCE.

PROCESS FOR TRANSFORMING ALKALINE-METAL MONOCHROMATES INTO BICHROMATES.

1,326,123.  Specification of Letters Patent.  Patented Dec. 23, 1919.

No Drawing.  Application filed December 18, 1918.  Serial No. 267,349.

*To all whom it may concern:*

Be it known that I, GERHARD NICOLAAS VIS, of 10 Rue de Vienne, Paris, France, chemist, have invented a new and useful Improved Process for Transforming Alkaline-Metal Monochromates Into Bichromates, which process is fully set forth in the following specification.

This invention relates to improvements in or modifications of the process described in the specification Serial No. 213,206 of 22nd January, 1918.

In this specification it is shown that by the action of carbonic acid alone upon alkaline metal monochromates, the greater portion of such salts can be transformed into bichromates with the simultaneous formation of alkaline metal bicarbonates. Otherwise stated, in place of recovering the sodium or potassium introduced into the process in the form of sulfate or chlorid they are recovered for the most part in the form of bicarbonates which may easily be transformed into alkaline metal carbonates that is into one of the materials necessary for the disintegration of chrome ore.

This invention has for its object a still more complete recovery in the form of bicarbonates of the sodium or potassium.

According to this invention ammonia is employed in conjunction with the carbonic acid; the invention therefore consists in the application of the base of the Solvay process to alkaline metal monochromates. In order to afterward transform the ammonium chromate thus formed into sodium bichromate for example, it is after being previously transformed into calcium chromate treated with sodium bisulfate.

By causing carbonic acid to react upon a solution of an alkaline metal monochromate containing a sufficient quantity of free ammonia the reaction $Na_2CrO_4 + 2CO_2 + 2NH_3 + 2H_2O = (NH_4)_2CrO_4 + 2NaHCO_3$ is not quite complete although much more than half of the sodium monochromate is decomposed.

If there be added an excess of ammonium carbonate, which is transformed into ammonium bicarbonate by the introduction of carbonic acid in excess, the sodium bicarbonate becomes so insoluble that nearly all the sodium originally contained in sodium chromate separates out in the form of sodium bicarbonate.

This latter salt is by filtration and washing separated from the solution of ammonium chromate which still contains a relatively small quantity of sodium chromate.

This latter solution is first subjected to distillation to remove the ammonium carbonate or bicarbonate present. There is then added slaked lime, in a quantity equivalent to the quantity of the ammonium still present in the form of mono or bichromate of ammonium, so that calcium monochromate is formed; all the ammonia is then removed from the solution by a second distillation.

The residue of the distillation is a pulp composed mainly of calcium chromate suspended in a solution containing a little sodium chromate which remains undecomposed from the first reaction.

In order to form calcium sulfate and sodium bichromate there is added to this pulp a quantity of sodium bisulfate equivalent to the acid necessary by the well known reaction to form bichromate.

The insoluble calcium sulfate is separated by filtration while the sodium bichromate is obtained by concentration and crystallization of the filtrate.

Thus nearly all the caustic or carbonated alkali introduced in the disintegration of a chrome ore or a chrome compound to form alkaline metal monochromate can be recovered in the form of alkaline metal bicarbonate while finally the alkali necessary for the formation of the bichromate is introduced in the form of bisulfate. The advantage of the process is derived from the fact that the alkaline metal bisulfates and especially sodium bisulfate are much cheaper than their carbonates.

Example: 810 grams of sodium monochromate are dissolved in 2 liters 600 c. c. of water. 340 grams of ammonia are then introduced and after cooling to the ordinary temperature the mixture is saturated with carbonic acid of which in all 860 grams are absorbed. The temperature is maintained during the entire process at between 30 and 35° C. Soon after the introduction of the carbonic acid a precipitation of sodium bicarbonate takes place the quantity of which increases as the carbonic acid is absorbed.

After saturation by the carbonic acid the sodium bicarbonate is filtered and dried; in all 1710 grams are obtained of a product composed of sodium bicarbonate impregnated with an ammoniacal solution of ammonium chromate. By washing this mixture with a saturated solution of sodium bicarbonate until complete removal of the ammonium chromate, there is obtained after calcination 460 grams of pure sodium carbonate which represents 86.8% of the quantity theoretically obtainable, i. e. if all the sodium contained in the 810 grams of sodium chromate in the process were transformed into sodium bicarbonate.

The resulting solution containing ammonium bicarbonate in excess, a little sodium monochromate but mainly ammonium monochromate, is transformed into sodium bichromate as above set out.

Claim:

The improvement in the process for transforming alkaline metal monochromates into bichromates which consists in subjecting a solution of alkaline metal monochromate to the action of carbonic acid and ammonia in presence of excess of ammonium bicarbonate to facilitate separating the resulting sodium bicarbonate from the solution of ammonium chromate formed, then transforming said ammonium chromate into calcium chromate by means of lime and then reacting said calcium chromate with alkaline metal bisulfate to form alkaline metal bichromate.

In testimony whereof I have signed this specification.

GERHARD NICOLAAS VIS.

Witnesses:
 JOHN F. SIMONS,
 GASTON DE MESTRAL.